US009518561B2

(12) United States Patent
De Boer et al.

(10) Patent No.: US 9,518,561 B2
(45) Date of Patent: Dec. 13, 2016

(54) METHOD FOR THE OPERATION OF A WIND TURBINE

(75) Inventors: Wolfgang De Boer, Moormerland (DE); Georg Eden, Westerholt (DE); Alfred Beekmann, Wiesmoor (DE); Gerhard Lenschow, Aurich (DE)

(73) Assignee: Wobben Properties GMBH, Aurich (DE)

( * ) Notice: Subject to any disclaimer, the term of this patent is extended or adjusted under 35 U.S.C. 154(b) by 1062 days.

(21) Appl. No.: 13/642,112

(22) PCT Filed: Apr. 12, 2011

(86) PCT No.: PCT/EP2011/055737
§ 371 (c)(1),
(2), (4) Date: Jan. 2, 2013

(87) PCT Pub. No.: WO2011/131522
PCT Pub. Date: Oct. 27, 2011

(65) Prior Publication Data
US 2013/0106108 A1 May 2, 2013

(30) Foreign Application Priority Data

Apr. 19, 2010 (DE) .......... 10 2010 015 595
Apr. 8, 2011 (DE) .......... 10 2011 007 085

(51) Int. Cl.
*F03D 7/02* (2006.01)
*F03D 7/04* (2006.01)
*F03D 1/06* (2006.01)

(52) U.S. Cl.
CPC ........... *F03D 7/0264* (2013.01); *F03D 1/0675* (2013.01); *F03D 7/045* (2013.01); *F03D 7/048* (2013.01);
(Continued)

(58) Field of Classification Search
CPC ........ F03D 1/0675; F03D 7/045; F03D 7/048; F03D 7/0264; F03D 11/0025; F05B 2270/32; F05B 2270/325; F05B 2270/335
See application file for complete search history.

(56) References Cited

U.S. PATENT DOCUMENTS 6,503,058 B1   1/2003  Selig et al.
6,890,152 B1   5/2005  Thisted
(Continued)

FOREIGN PATENT DOCUMENTS

AU   2009 339 713 A1   1/2011
CN       1441876 A     9/2003
(Continued)

OTHER PUBLICATIONS

Sarkar, Asis et al., "Wind Turbine Efficiency and Power Calculation with Electrical Analogy", Feb. 2, 2012, International Journal of Scientific and Research Publications, vol. 2, Issue 2.*

*Primary Examiner* — Eric Keasel
*Assistant Examiner* — Cameron Corday
(74) *Attorney, Agent, or Firm* — Seed Intellectual Property Law Group LLP

(57) ABSTRACT

The invention relates to a method for operating a wind turbine comprising an aerodynamic rotor that has at least one rotor blade. Said method comprises the steps of operating the wind turbine at an operating point that depends on the wind speed, detecting an operating parameter of the operating point, comparing the detected operating parameter with a predetermined reference quantity, and heating the at least one rotor blade when the detected operating parameter exceeds a predetermined variation from the reference quantity, the operation of the wind turbine being continued.

12 Claims, 5 Drawing Sheets

(52) U.S. Cl.
CPC .......... *F03D 80/40* (2016.05); *F05B 2270/32* (2013.01); *F05B 2270/325* (2013.01); *F05B 2270/335* (2013.01); *Y02E 10/721* (2013.01); *Y02E 10/722* (2013.01); *Y02E 10/723* (2013.01)

(56) References Cited

U.S. PATENT DOCUMENTS

| | | | |
|---|---|---|---|
| 7,182,575 B2 | 2/2007 | Grabau | |
| 8,183,707 B2 | 5/2012 | Siebers et al. | |
| 2009/0110539 A1* | 4/2009 | Uphues | F03D 7/026 415/13 |
| 2011/0089692 A1 | 4/2011 | Girardin | |
| 2011/0229336 A1* | 9/2011 | Richter | B29C 65/505 416/226 |
| 2013/0106108 A1 | 5/2013 | De Boer et al. | |
| 2014/0091572 A1 | 4/2014 | Jepsen | |

FOREIGN PATENT DOCUMENTS

| | | | |
|---|---|---|---|
| CN | 1729359 | A | 2/2006 |
| CN | 101424248 | A | 5/2009 |
| DE | 195 28 862 | A1 | 2/1997 |
| DE | 196 21 485 | A1 | 3/1998 |
| DE | 200 14 238 | U1 | 7/2001 |
| DE | 103 23 785 | A1 | 12/2004 |
| DE | 10 2005 016 524 | A1 | 12/2005 |
| EP | 2 055 940 | A2 | 10/2008 |
| EP | 2 112 373 | A2 | 10/2009 |
| EP | 2 199 606 | A2 | 12/2009 |
| JP | 1-131876 | U | 9/1989 |
| JP | 2005-069082 | A | 3/2005 |
| JP | 2006-528307 | A | 12/2006 |
| JP | 2008-523299 | A | 7/2008 |
| JP | 2008-286114 | A | 11/2008 |
| RU | 74170 | U1 | 6/2008 |
| SU | 1652645 | A1 | 5/1991 |
| WO | 01/83983 | A1 | 11/2001 |
| WO | 2004/104412 | A1 | 12/2004 |
| WO | 2007/129907 | A2 | 11/2007 |
| WO | 2011/131522 | A2 | 10/2011 |
| WO | 2012/168089 | A1 | 12/2012 |

* cited by examiner

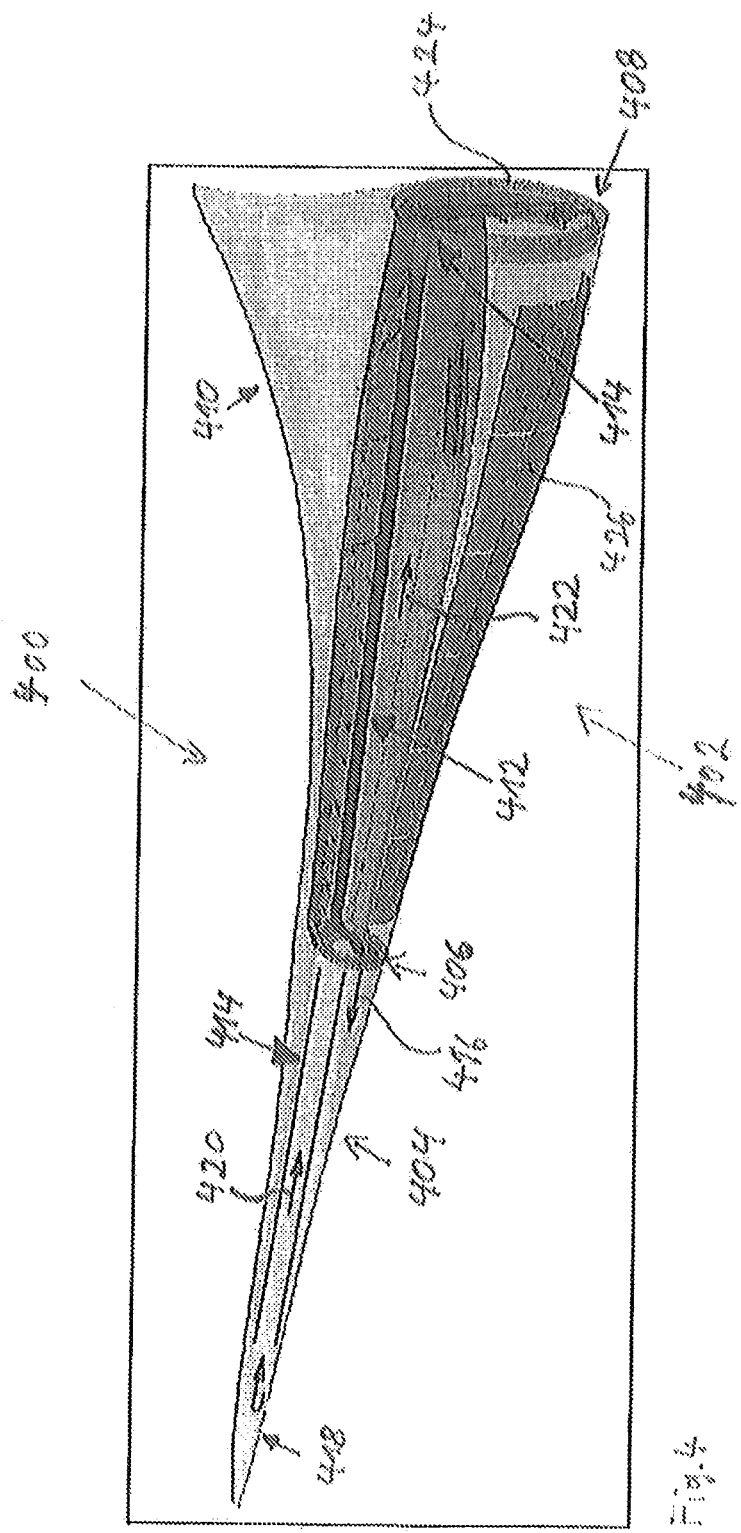

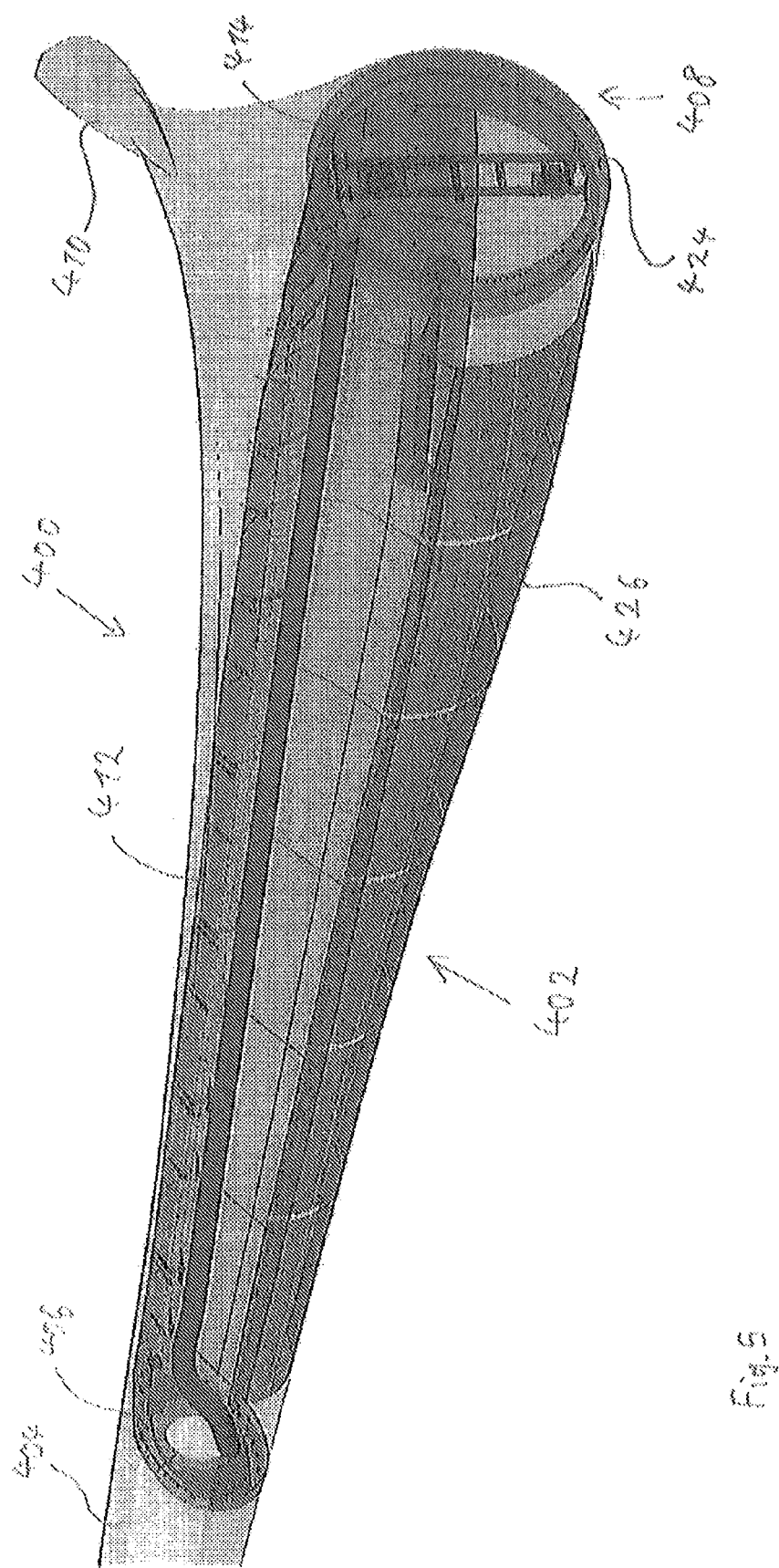

METHOD FOR THE OPERATION OF A WIND TURBINE

BACKGROUND

Technical Field

The present invention concerns a method of operating a wind turbine or wind power installation and a corresponding wind power installation.

Description of the Related Art

Methods of operating a wind power installation have long been known. Thus it is for example usual for wind power installations to be operated on the basis of a predetermined power characteristic which depends on the wind speed. In the case of wind power installations with rotor blades involving an adjustable rotor blade angle—generally also referred to as the pitch angle—that can also be adjusted to implement the respectively desired operating point of the wind power installation.

Such methods of operating a wind power installation however can encounter their limits if unforeseen or unusual circumstances occur such as for example icing on parts of the wind power installation. A particular problem in that respect is represented by icing of the rotor blades. Such icing causes problems because it can result in ice dropping off the rotor blades, which is dangerous for people who are below the rotor blades. The danger of such dropping ice can be increased if the wind power installation should continue to be operated in that condition.

Another problem with icing on the rotor blades is that the properties of the wind power installation are altered and regulation of the installation can be disturbed thereby. In addition, depending on the respective amount of ice formation on the wind power installation, in particular on the rotor blades, there is the risk of damage to the wind power installation.

Methods are known which try to detect ice formation on the rotor blades in order then to stop the wind power installation and shut it down to protect it. In addition, the attempt can be made to remove the ice, in the stopped condition of the installation. DE 103 23 785 A1 describes a method of detecting ice accretion.

A problem in that respect is that of reliably detecting ice accretion. Because safety aspects involve a high and usually the highest priority, shut-down of the installation is often already effected when there is a suspicion of ice accretion. That can result in unwanted and, considered objectively, unnecessary wind power installation stoppage times. Depending on the respective erection site that can add up to considerable economic losses.

BRIEF SUMMARY

The object of the present invention is as far as possible to eliminate or to reduce the aforementioned disadvantages. In particular the invention seeks to propose a solution which increases the efficiency of a wind power installation, and in particular provides an improvement in the operating characteristics of a wind power installation upon ice accretion or with the threat of ice accretion. At least the invention seeks to propose an alternative solution.

BRIEF DESCRIPTION OF THE SEVERAL VIEWS OF THE DRAWINGS

FIG. 4 shows a partly sectional perspective view of a rotor blade according to a further embodiment, and FIG. 5 shows another view of a portion of the rotor blade of FIG. 4.

Figure 1:
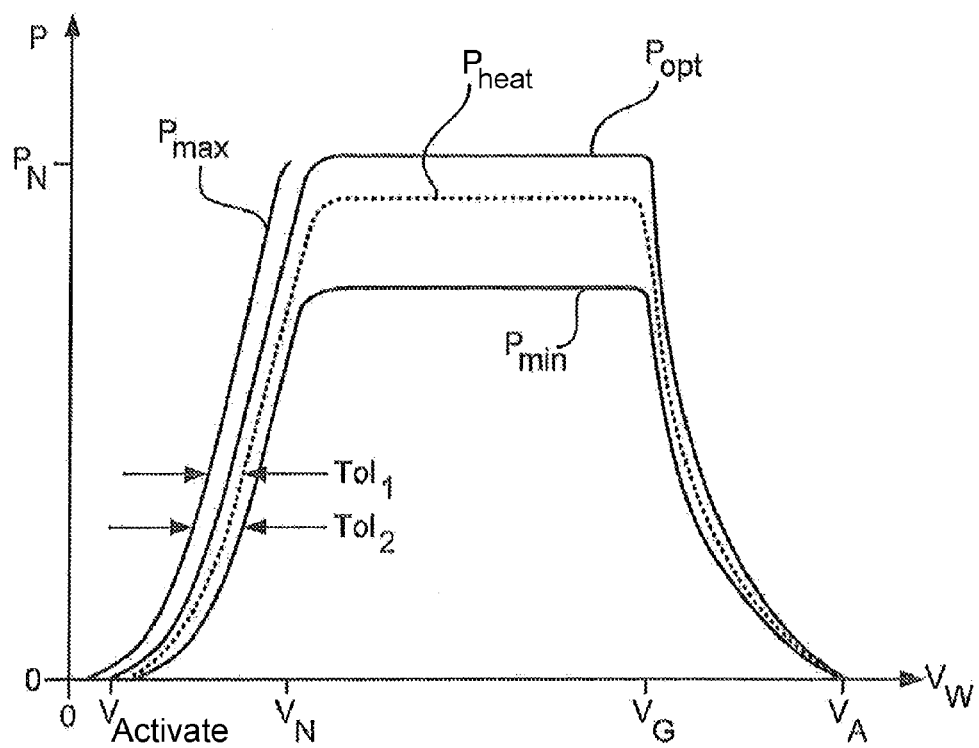
FIG. 1 diagrammatically shows a power-optimized characteristic with a first and a second tolerance range for the power of a wind power installation in dependence on the wind speed, FIG. 2 diagrammatically shows power characteristics similarly to FIG. 1, but for a sound-optimized mode of operation, FIG. 3 diagrammatically shows a partly sectional view of a rotor blade with indicated circulating air flow.

The Figures hereinafter can have identical references or identifications for similar but possibly not identical features.

DETAILED DESCRIPTION

A method according to one embodiment of the invention of operating a wind power installation is based in particular on a wind power installation comprising a foundation carrying a pylori, at the upper end of which is arranged a pod. The pod has at least one generator and an aerodynamic rotor connected directly or indirectly thereto. In particular the arrangement adopted as the basic starting point has a rotor with a substantially horizontal axis and a hub with at least one and preferably three rotor blades.

The wind power installation is operated at an operating point dependent on the wind speed. For example, based on a predetermined rotary speed-dependant power characteristic, the electrical power delivered by the generator is adjusted until a steady-state operating point with a predetermined rotary speed and a given delivered power is set. That operating point is dependent on the wind speed. At least one operating parameter of that operating point is detected. For example the electrical power delivered by the generator is detected and forms the detected operating parameter. That can be a measurement value or a value calculated from one or more measurement values. The detected operating parameter used can also be an internal calculated parameter or control parameter which is afforded for example upon operation of the wind power installation at the operating point or is detected in any case.

The detected operating parameter—in the foregoing example the delivered electrical generator power—is compared to a predetermined reference parameter. In accordance with the above example, this involves a comparison of the detected power with a reference power.

If now the detected operating parameter exceeds a predetermined deviation in relation to the detected reference parameter, at least one rotor blade is heated, in which case operation of the wind power installation is continued. Preferably in that case all rotor blades of the wind power installation are heated. The reference to continuation of operation of the wind power installation is used here in particular to mean that the rotor continues to rotate and the generator continues to deliver electrical power which continues to be fed into an electric network, such as an electric three-phase ac voltage network.

Heating can be made dependent on further boundary conditions.

The reference parameter used is in particular a value typical of the present operating point, in particular the wind speed prevailing in this case. The detected value which can also be referred to as the actual value is thus compared to a value expected under normal conditions. Minor deviations are permitted. If however a predetermined deviation relative to the reference parameter is exceeded, that is assumed to be an atypical operating condition. It was now realized that it may be advantageous, in the event of a deviation which points to ice accretion at a rotor blade, not to stop and shut down the wind power installation but to continue to operate it and to counteract the assumed icing by heating of the rotor blade. The predetermined deviation between the detected operating parameter and the corresponding reference parameter can in that case be so selected that ice accretion is counteracted at an early stage. Stopping and shutting down the installation can thus be prevented at times. By virtue of the option afforded in that way, of continuing to operate the wind power installation in spite of the suspicion of ice accretion, the wind power installation can continue to be operated and thus efficiency can be increased in situations, particularly in winter, when hitherto the wind power installation would have had to be shut down. Particularly in winter that provides that the amount of electrical energy delivered by the generator can be increased. The method can also be preventatively used by virtue of early detection of ice accretion and implementation of heating of the rotor blades.

The predetermined deviation can be provided as a fixed value by which the detected operating parameter is not to rise above or fall below the reference parameter. It may however also be considered that the deviation is selected differently in respect of exceeding the predetermined reference parameter on the one hand and falling below the predetermined reference parameter on the other hand. The predetermined deviation can also be selected to be different depending on the respective operating point or in dependence on other parameters.

Preferably a first tolerance range and a second tolerance range are predetermined in relation to the reference parameter in question, the first tolerance range being within the second tolerance range. The respective reference parameter is disposed in both tolerance ranges. The two tolerance ranges however do not have to uniformly include the reference parameter. Rather, a limit of the first tolerance range can also coincide with the limit in question of the second tolerance range and at the same time the other limit of the first tolerance range can define a smaller spacing relative to the reference parameter than the corresponding limit of the second tolerance range.

The underlying idea here is that optimum power conversion of the prevailing wind into electrical power to be delivered by the generator is achieved with rotor blades without ice accretion. If now—for the example of detection of the delivered power of the generator as the detected operating parameter—slight deviations occur between the detected power and the reference power, it is firstly assumed that natural fluctuations or alterations in some boundary parameters such as air density are the underlying cause here. The wind power installation can thus continue to be operated without change, for such slight deviations.

If however the detected operating parameter is outside the first tolerance range and thus exceeds a first predetermined deviation, it is to be assumed that this involves an unusual situation such as for example ice accretion. If in that case the detected operating parameter is still within the second tolerance range, it is assumed that this involves ice accretion which is not yet so severe. In that case the wind power installation does not need to be stopped or shut down, but heating of the rotor blade is effected to counteract the ice accretion.

If now the deviation is so great that the detected operating parameter is also outside the second tolerance range then it is assumed that this situation involves an excessively great ice accretion so that the wind power installation is stopped. On the other hand this situation can also include a fault, for example in detection of the operating parameter. In this case also the installation is to be stopped.

If the detected power is above the reference power, that is to say above the usual power, it is to be assumed that this does not involve ice accretion but rather a measurement disturbance or another fault or disturbance. In that case the limit value of the first tolerance range and the second tolerance range is the same value because heating of the rotor blade in the case of a measurement fault is not desirable. If however the detected power is below the reference power and thus below the expected value, that indicates a worsening of efficiency of the wind power installation, which points to ice accretion. In that case therefore heating of the rotor blade is effected to counteract the icing insofar as the deviation is not yet so great.

If however the deviation is too great, namely so great that the detected operating parameter is outside the second tolerance range, then the wind power installation is stopped and/or shut down to obviate any damage. An excessive deviation can also point to a wind power installation control system which is not operating correctly.

In a further embodiment it is proposed that the detected operating parameter is the power, in particular the power produced by the wind power installation, that is to say by the generator, and/or the current wind speed is detected and the reference parameter is dependent on the wind speed. In particular the reference parameter is stored as a reference characteristic dependent on the wind speed. A possible way of recording such a reference characteristic is described in DE 103 23 785 A1.

To compare the detected operating parameter to the reference value the procedure involved can be as follows. For the wind power installation, an operating point is set in dependence on a predetermined relationship between rotary speed and power. In addition the prevailing wind speed is measured, wherein that measurement value was not used for setting the operating point. In relation to that measured wind speed value, a reference value for the power, which is set usually under normal conditions, is stored in a characteristic curve or a reference table—a so-called lookup table —. The detected power which has been produced when setting the operating point is compared to that value of the power, that is stored in relation to the currently prevailing wind speed.

If, with the currently prevailing operating point, the situation involves normal boundary conditions, in particular no icing, a power which approximately corresponds to the power stored in relation to the currently prevailing wind speed, as the reference parameter, may be set when setting the operating point. Slight deviations can be tolerated. If greater deviations occur it can be assumed that the situation involves slight icing and heating of the rotor blade is caused to occur. In particular that happens when the detected power is less than the associated reference value.

When the deviation is above a particular level, stoppage and/or shut down of the installation should be effected.

The use of the power is only one possibility which is proposed in particular in relation to wind power installations with an adjustable rotor blade angle in the so-called part-load range. In the part-load range, the rotor blade angle is usually not adjusted but rather is constant over the entire part-load range, that is to say for wind speeds from a start-up wind speed at which the wind power installation first starts at all, to a nominal wind speed at which the wind power installation has reached its nominal rotary speed and nominal power, under normal conditions.

In that full-load range, basically regulation of the rotary speed is effected by adjusting the rotor blade angle—so-called pitch adjustment—to the nominal rotary speed. The power is regulated to the nominal power. Thus—at any event in the ideal case—the power and the rotary speed are constant in the full-load mode of operation. Thus there also cannot be any wind speed-dependent deviation in the set power, from the reference power. The set power is here unsuitable as an indicator for icing.

In a corresponding fashion, in the full-load mode of operation a comparison of the set rotor blade angle to a reference rotor blade angle is proposed. The reference rotor blade angle is also stored in dependence on the wind speed. The use of the rotor blade angle as a reference parameter is also proposed for a range which for even higher wind speeds adjoins the full-load range, namely a so-called storm range which for example can be between wind speeds of 28 m/s and 42 m/s, to give just an example.

Thus ice accretion detection in the part-load range is effected by way of the comparison of the detected power with a reference power. In the full-load mode detection of ice accretion is effected by way of the comparison of the set rotor blade angle with a reference angle. Nonetheless it is preferably proposed that both criteria always be checked in the part-load mode and/or in the full-load mode, that is to say that the power is always compared to the reference power and the set rotor blade angle is always compared to the reference rotor blade angle. Ice accretion is to be assumed to be occurring when at least one of those comparisons points to such ice accretion. The underlying realization here is that the respectively unsuitable comparison would not indicate ice accretion, not even falsely.

Preferably slight adjustment of the rotor blade angle is already effected in a transitional range from the part-load range to the full-load range. By way of example the rotor blade angle can be adjusted in the transitional range by an empirical value of 0.4° per 100 kW. By virtue of the proposed simultaneous checking both of the operating parameter power and also the operating parameter rotor blade angle the described slight adjustment of the rotor blade angle in the transitional range from the part-load range to the full-load range does not cause any problems as a result in regard to monitoring ice accretion. In other words, this avoids the error of taking the wrong operating parameter as the basis, if both are always monitored.

In a further embodiment it is proposed that a maximum value of the operating parameter in question be used as the reference parameter at least for sub-ranges of wind speed. That can also be provided temporarily.

Preferably a wind speed-dependent reference parameter is used as the reference characteristic. For each type of installation, such a reference characteristic such as for example a wind speed-dependent power characteristic can be stored at the factory as a standard characteristic—also referred to as the default characteristic. That standard reference characteristic is initially used directly after the wind power installation is brought into operation. Ultimately however each wind power installation has its own manner of performance. That can be due to manufacturing fluctuations and also in dependence on the respective erection site and further circumstances. For that reason each wind power installation adapts that standard characteristic in the course of operation thereof. That is effected by using measured values under assumed normal boundary conditions of the wind power installation, in particular under conditions at which icing can be excluded. The measured values are then processed to give a corresponding reference characteristic. Known fluctuations which occur for example at different ambient temperatures such as for example 3° C. and 30° C. in terms of air density can be taken into account by a suitable adaptation factor. In that way it is possible to record only one reference characteristic in spite of fluctuating boundary conditions.

In a wind power installation, boundary conditions can occur leading to a massive deviation in the installation-specific reference characteristic relative to the stored standard reference characteristic. Thus for example it is possible to provide wind power installations with specifically targeted throttling of their power output in order for example to limit the sound emission caused by the wind power installation. That can lead to another reference characteristic which the wind power installation records in the course of operation thereof and which it uses as its basis as an altered reference characteristic. As long as such adaptation has not occurred or has occurred only for a part of the reference characteristic, the reference characteristic is unsuitable for ice detection. In that case it is proposed that the maximum value be taken as the basis—in the present example the power limitation for limiting sound emission. Ice accretion is then assumed to occur in that case when the relevant value falls below that maximum value by a predetermined amount, which can differ from the amount which would be applied when using a reference characteristic.

Such a use of a maximum value can be effected portion-wise if parts of the reference characteristic have already been adapted but other parts have not yet, or such use can be effected time-wise or also time-wise and portion-wise. For example it may also be considered that the wind power installation is to be operated only at times with a reduced power, if for example the operator of the network into which the wind power installation feeds asks for a reduction in the delivered power. In this case also the maximum value which is given on the basis of the reduction is adopted as the reference value. Just a short time later such a limitation can be removed again.

In an embodiment it is proposed that, for heating the at least one rotor blade, heated air is fed to the rotor blade and passed on a flow path through the rotor blade to heat the rotor blade from the interior. Rotor blades of modern and large wind power installations frequently have hollow spaces which are separated from each other by stabilizing connecting limbs. It is thus proposed that, utilizing such hollow spaces, heated air is passed internally in the rotor blade along the leading edge of the rotor blade into the proximity of the rotor blade tip, that is to say the part of the rotor blade that is remote from the rotor blade hub. There, in the proximity of the rotor blade tip, there can be an opening in a stabilization limb or other wall, through which the heated air flows into a hollow space and back for example through a central region of the rotor blade to the rotor blade root and thus basically to the rotor blade hub. In that way it is also advantageously possible to produce a circulating air flow by that returning air being heated again and passed again along the leading edge into the rotor blade. One or more fans and one or more heating elements can be provided for that purpose.

Alternatively or additionally an electrical resistance heating element such as for example a heating mat or a plurality thereof can be arranged and in particular embedded at regions of the rotor blade, that are to be heated.

A further embodiment proposes that a temperature is detected at or in the proximity of the wind power installation, in particular an outside temperature, and the wind power installation is shut down if the detected temperature is below a predetermined minimum temperature and if the detected operating parameter exceeds the predetermined deviation relative to the reference parameter. Optionally a fault signal is produced and/or outputted. For that purpose, the underlying realization is that at temperatures below 0° C. icing does not admittedly have to occur, but icing can be excluded above a given temperature such as for example 2° C. The value of 2° C. is slightly above the freezing point of water and thus takes account of a slight tolerance in respect of temperature measurement or slight local temperature fluctuations. If therefore the criterion of ice accretion is detected by comparison of the operating parameter with the reference parameter, but the outside temperature which exceeds the predetermined temperature value excludes ice accretion, it is assumed that the situation involves a fault situation and it is advisable for the installation to be at least stopped and preferably also shut down. For detecting and evaluating the fault it is proposed that a fault signal be generated for that purpose and communicated to a control unit and/or passed to a central monitoring system by way of a communication connection.

Preferably heating is effected when the temperature falls below a predetermined temperature value such as for example a value of 2° C. It is also possible to select for example a value of 1° C. or 3° C.

In a further preferred embodiment it is proposed that heating is effected only when the detected operating parameter has exceeded the predetermined deviation relative to the reference parameter for a first predetermined minimum time. That therefore avoids heating of the rotor blades being effected immediately upon a first comparison between operating parameter and reference parameter, that indicates ice accretion. Here on the one hand the situation is based on the realization that the formation of an ice accretion requires a certain time. In addition there is the possibility that a slight ice accretion possibly deviates again on its own for a short time or is reduced. Finally this also avoids a possible individual defective measurement already triggering heating. The first predetermined time can also be composed or modified, that is to say for example there can be a minimum time of 10 minutes, in which respect there does not have to be a requirement that ice accretion was detected for an uninterrupted period of time of 10 minutes. Rather, it can be provided that this minimum time is increased by times in which ice accretion was not detected in the meantime. Advantageously such checking is effected by counters. By way of example, a comparison between operating parameter and reference parameter can be effected at a minutes rhythm—or at other times. Each time that in that case a possible ice accretion is detected, a corresponding counter is increased by a value until it reaches a predetermined value of for example 10. If in the meantime the situation occurs that ice accretion is not detected, then the counter can also be counted down again.

Preferably an outside temperature is taken into consideration at the same time so that generally ice accretion is assumed to be occurring only when a predetermined outside temperature for example in the range of 1° to 3°, in particular 2° C., is reached, or the temperature falls below that predetermined outside temperature, and also times in which the outside temperature is higher are generally not taken into consideration. The above-described counter for detecting the minimum time therefore counts up only when the outside temperature is sufficiently low.

In addition or optionally it is also proposed that the wind power installation is shut down only when the first operating parameter was outside a or outside the second tolerance range for a predetermined minimum time. That also avoids excessively sensitive stoppage or shut-down.

It is desirable if, after a stoppage or shut-down, that is to say generally after the wind power installation has been stopped, the installation is re-started after a predetermined re-start time, governed by detection of an operating parameter outside the second tolerance range. That re-start time can be several hours such as for example 6 hours. On the one hand, in the event of heating of the rotor blades in the stopped condition after 6 hours it is possible to reckon on successful de-icing, while on the other hand that can be a sufficient time for any weather conditions to have changed again. The wind power installation can now be started again and can be at least partially run up, in which case criteria for detecting ice accretion are also monitored in that process. If in that respect criteria which point to ice accretion are found, the operator should not wait too long to stop the installation again and to again wait for the predetermined re-start period of time. It is thus proposed that the wind power installation is stopped again when the detected operating parameter lay outside the second tolerance range for a third predetermined minimum time which is shorter than the second predetermined minimum time. That third predetermined minimum time can also be monitored by a counter. For that purpose it is possible to use the same counter as for the second predetermined minimum time. The shorter time is then implemented by the counter not changing to zero after the stoppage, but by it being reduced only by a few values. Accordingly the counter is again, by a few values, at its maximum value which results in a stoppage.

It is desirable if, in the case of heating, that is maintained for a predetermined fourth minimum time. Here the underlying realization is that heating is intended to effect thawing and/or prevention of ice accretion. In that case the basic starting point adopted is thermal time constants below which heating appears to be less appropriate. Thus for example heating can be effected at least for 10 minutes or at least for 20 minutes.

It is also proposed that, after termination of a heating operation, renewed heating is effected only after a predetermined fifth minimum time. That makes it possible to avoid rapidly switching the necessary heating arrangement on and off. Presetting the predetermined fifth minimum time can be effected for example by using a counter which is preferably to be used for the first predetermined minimum time. That counter can be reduced by a corresponding number which corresponds to the fifth predetermined minimum time and for heating purposes the counter would then first have to be correspondingly counted up by those values.

In another embodiment the wind power installation has an anemometer. The wind speed is measured by the anemometer and a wind speed-dependent reference value can be obtained from a corresponding reference characteristic or table. Preferably an ultrasonic anemometer is used which does not itself have any moving parts. Thus it is possible for the rotor blades to ice up whereas the ultrasonic anemometer does not ice up or at least the icing thereof is so slight that a wind speed can still be reliably measured.

Preferably a wind power installation has a central control unit with which a method of operating a wind power installation according to the invention can be carried out. The control unit can have implemented suitable program codes for that purpose for controlling the installation and the control unit can also include a data store which includes one or more reference characteristics and/or tables with reference parameters which are used for performing the method of operating the wind power installation.

It is desirable if the characteristic at least for a portion, in particular in the part-load range, is stored in the form of a cubic function, that is to say for example for the power in dependence on the rotary speed or for the power P as a function in dependence on the wind speed $V_W$ as follows:

$$P = a + b*V_W + c*V_W^2 + d*V_W^3$$

The coefficients a, b, c and d can be ascertained from measurement values. A cubic curve also occurs when one or more of the coefficients a, b and c assume the value zero if d is not equal to zero.

Preferably there is also provided a heating device having at least one blower and at least one heating element which can be integrated in a unit. Preferably such a heating device is provided for each rotor blade. It is also desirable if the rotor blade has a through opening in the region of its rotor blade tip in the interior of the rotor blade to divert an air flow for heating purposes in the region of the rotor blade tip.

In another embodiment alternatively or additionally a resistance heating element like a heating mat or an arrangement of a plurality of heating mats is used.

In addition there is proposed a method of operating a wind power installation having an aerodynamic rotor with at least one rotor blade, which involves monitoring whether there is icing on the wind power installation, in particular by an ice sensor for detecting ice accretion, and in which the at least one rotor blade is heated when ice accretion has been detected, in which case operation of the wind power installation is continued.

Here ice accretion can be detected with a sensor or the ice accretion is for example detected as described hereinbefore. With this procedure it is also proposed that the installation is not shut down in the case of an ice accretion, but continues to be operated with heating of the rotor blades, in particular the aerodynamic rotor of the wind power installation is to continue to rotate and the wind power installation is to continue to feed energy into the network.

In addition there is proposed a method of operating a wind park comprising a plurality of intercommunicating wind power installations, each having an aerodynamic rotor with at least one rotor blade, which monitors whether there is icing at least one of the wind power installations, in particular by an ice sensor for detecting an ice accretion, and the at least one rotor blade of each of the wind power installations is heated when ice accretion has been detected, in which case operation of the wind power installations of the wind park is continued.

Here the underlying realization is that precise and reliable detection of ice accretion can require a special expensive sensor. The environmental conditions, in particular weather conditions, which lead to ice accretion, are however at least similar for the individual wind power installations within a wind park. It may then be sufficient to monitor only one wind power installation which is representative of the wind park but at least a part thereof.

The communication of the wind power installations of a wind park with each other is effected for example by way of an SCADA system adapted to wind power installations (Supervisory Control and Data Acquisition).

Even when using a sensor for detecting an icing condition it is preferably proposed that one or more of the method steps or features or criteria be adopted, which were described hereinbefore in connection with the detection of icing by comparison of a detected parameter with a reference parameter. That applies in particular but not exclusively to the use of the delay times and the use of counters. Evaluation of the outside temperature can also be used in the same manner insofar as this can be applied.

Preferably heating is already effected when the outside temperature is below a predetermined value such as for example in the range of 1° C. to 3° C., in particular 2° C., without further investigations of ice accretion being implemented. In that case ice accretion detection is dispensed with and, below that temperature value, continuous heating is effected until the predetermined temperature is exceeded again. It was recognized here that the additional energy generated by improving the aerodynamics of the rotor blades by thawing the ice is greater than the energy used for heating. The overall energy balance sheet can thus be improved by the heating operation even when heating is always effected at cold temperatures. It was realized that a greater energy loss is to be expected if unrecognized ice accretion is not combated, than if heating is effected unnecessarily. That applies in particular when the heating power is controlled, as described above, in dependence on the energy generated.

A possible way of implementing such temperature-dependent continuous heating in terms of control technology provides setting the above-described tolerance range to zero. In the example in FIG. 1 this means that $P_{Heat}$ is set to 100% of $P_{Opt}$, or to an even higher value.

In accordance with a further embodiment there is proposed a rotor blade for fixing to a rotor blade hub, namely a hub of a rotor of a wind power installation. The rotor blade includes a main portion for fixing to the hub. The rotor blade further includes an end portion for fixing to the main portion. In addition there can be provided at least one intermediate portion and in that case the end portion can be fixed to the intermediate portion, more specifically in addition or alternatively.

The main portion and the end portion are initially provided as separate parts in particular in manufacture and are assembled later, in particular when erecting the wind power installation. The assembly procedure is preferably implemented by screwing. In particular in normal use the hub carries the main portion and the main portion carries the end portion.

The main portion includes a blade root region for fixing to the hub and a connecting region for fixing to the end portion and/or the or an intermediate portion, wherein provided in the main portion is an air guide tube for passing heated air through the main portion from the root region to the end portion, wherein the air guide tube is so designed that the heated air, on passing through, does not come into contact with the main portion. Thus heated air is passed through the main portion, which however is not used for heating the main portion but is first intended to heat the end portion.

Preferably there is provided a rotor blade which is characterized in that provided in the main portion are regions having a flat heating device for heating the rotor blade and regions having a thermal insulation for preventing a heat loss from the rotor blade, the main portion is made substantially from metal, in particular steel, the end portion is substantially made from a composite material, in particular glass fiber-reinforced plastic (GRP), and/or the end portion is partially insulated towards the exterior.

These features are preferably provided in combination but each in itself also forms a desirable configuration. A combination of a main portion of metal with an end portion of a composite material makes it possible to use the advantages of a metallic material like stability and protection against lightening, while at the same time it is possible to provide a comparatively light rotor blade.

There is further proposed a wind park which has implemented a method according to the invention.

FIG. 1 shows a graph illustrating the power of the wind power installation, namely the power P generated by the generator, in relation to wind speed $V_W$. The characteristic identified by $P_{Opt}$ represents a configuration for the power for the case of power-optimal regulation of the wind power installation, as was ascertained on the basis of a prolonged operating period of the underlying wind power installation. The Figure also shows a minimum power characteristic $P_{min}$ and a maximum power characteristic $P_{max}$. The two power characteristics $P_{min}$ and $P_{max}$ enclose the power-optimized characteristic $P_{opt}$ at any event in an initial region and form a second tolerance range $Tol_2$. If the detected power, with the wind speed $V_W$ measured in relation thereto, deviates so greatly from the reference value $P_{opt}$ that it is outside the second tolerance range $Tol_2$, that is to say below the characteristic $P_{min}$ or above the characteristic $P_{max}$, the wind power installation is stopped and possibly shut down. For example in the range from the nominal wind speed $V_N$ to the limit wind speed $V_G$, as from which the wind power installation is reduced in power, $P_{min}$ can be 75% of the power-optimized characteristic.

The maximum power $P_{max}$ is predetermined only for the part-load range, namely approximately up to the nominal wind speed $V_N$. There is no need to further establish the pattern of $P_{max}$ because in the course of the further variation therein, that is to say from wind speeds of the nominal wind speed $B_N$, greater power levels than the respective value of $P_{opt}$ are not to be expected.

In addition FIG. 1 shows a characteristic $P_{Heat}$ in broken line. If the measured power value, in which case the power can be averaged for example over a given time like 10 minutes, differs so greatly at the wind speed in question from the power-optimized value $P_{opt}$ namely it falls below it so greatly that the value is below the characteristic $P_{Heat}$ but is above the characteristic $P_{min}$, operation of the wind power installation is continued, the rotor continues to rotate, power is still produced and the rotor blades of the wind power installation are heated. No characteristic which is to be interpreted similarly to $P_{Heat}$ is shown above the power-optimized characteristic $P_{opt}$. This means that, when the respective value of the characteristic $P_{opt}$ is exceeded, heating of the rotor blades does not occur in any case.

The broken-line characteristic $P_{Heat}$ thus forms a first tolerance range $Tol_1$ with the characteristic of $P_{max}$. As long as the detected power is in that first tolerance range, no heating of the rotor blades is initiated, nor is the wind power installation stopped. On the contrary, the wind power installation continues to be operated unchanged. If however the detected value of the power is outside the first tolerance range but within the second tolerance range and thus between the broken-line characteristic $P_{Heat}$ and the characteristic $P_{min}$, then the rotor blades are heated.

In the illustrated example, in particular in the full-load range, the value of $P_{Heat}$ is approximately 90% of the value of $P_{opt}$. In the rest of the range the value of $P_{Heat}$ can also assume for example 90% of $P_{opt}$.

It is to be noted that the values for $P_{Heat}$ and also $P_{min}$ are determined and illustrated for the entire relevant wind speed range from $V_{Activate}$ to $V_A$. Nonetheless, as from approximately the nominal wind speed $V_N$, monitoring based on the comparison of a detected rotor blade angle with a wind speed-dependently stored rotor blade angle becomes relevant, which however is not shown in FIG. 1. Further monitoring of $P_{Heat}$ and $P_{min}$ is continued, but basically such rotor blade-dependent monitoring is not disturbance and in that range should also not lead to detection of ice accretion.

Figure 2:
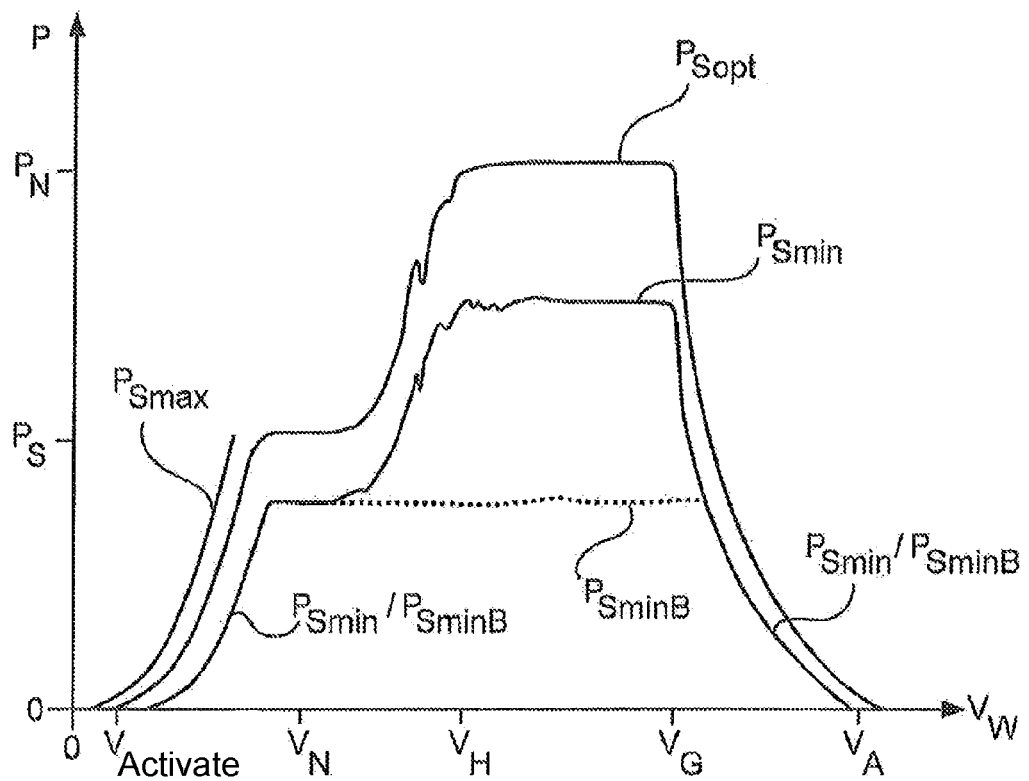

FIG. 2 shows a sound-optimized mode of operation. In this sound-optimized mode the power is not to exceed a reduced power value $P_S$ to keep sound emissions within limits. The installation-specific characteristic is intended to be characterized by the characteristic $P_{Sopt}$. In the case shown in FIG. 2 however verification of the power characteristic for the installation has not yet been concluded. The situation is therefore based on a standard characteristic which does not take account of that reduction and in relation to which an installation-specific characteristic which takes account of that reduction could not yet be completely detected. In the region of the limit wind speed and also still before same therefore $P_{Sopt}$ still assumes the value of the nominal power $P_N$. In the illustrated example the wind power installation was not yet operated or not yet operated noticeably at wind speeds which are somewhat above the wind speeds $V_H$ shown as an assistance aspect. Therefore $P_{Sopt}$ in part still assumes the illustrated high values. As soon as the wind power installation has been sufficiently often operated at the remaining wind speeds approximately from the wind speed $V_H$ which is illustrated as an assistance, the maximum value of the optimized power characteristic $P_{Sopt}$ may involve the value of $P_S$ which here is about 50% of the nominal power $P_N$. The power characteristic $P_{Smin}$ which is correspondingly calculated as the lower limit is oriented to the configuration of $P_{Sopt}$, that in part is not yet correct. Thus, in the region between the wind speed given as assistance and the limit wind speed $V_G$ the configuration $P_{Smin}$ assumes the value of 75% of $P_{Sopt}$. When now—for the first time—the wind power installation is operated with a wind speed in that range, a power level is set, which does not exceed the value $P_S$ because that is the absolute upper limit in the present case. For a wind speed $V_H$ however such a power is also to be below $P_{Smin}$. Consequently the wind power installation would have to be stopped. To avoid such unwanted stoppage a restricted minimum value is determined for $P_{Smin}$ which is illustrated as the characteristic $P_{SminB}$. That characteristic is about 75% below the present characteristic of $P_{Sopt}$ but at maximum up to 75% of the maximum permissible value of $P_S$. Thus stoppage of the wind power installation occurs only when a power value below that characteristic $P_{SminB}$ occurs.

It will also be seen from FIG. 2 that, for the wind speeds for which the power value $P_{Sopt}$ does not exceed the maximum permissible—sound-optimized—power $P_S$, the configuration of the characteristic $P_{Smin}$ and the characteristic $P_{SminB}$ coincide. The configuration of the maximum power characteristic $P_{Smax}$ is basically uninfluenced by the problems involved, wherein the characteristic of $P_{Smax}$ ends upon attainment of the maximum sound-optimized power $P_S$.

FIGS. 1 and 2 show an installation having a nominal power of 2000 kW and a characteristic configuration sound-optimized to a power value of 1000 kW shown in FIG. 2 as $P_{Sopt}$.

Figure 3:
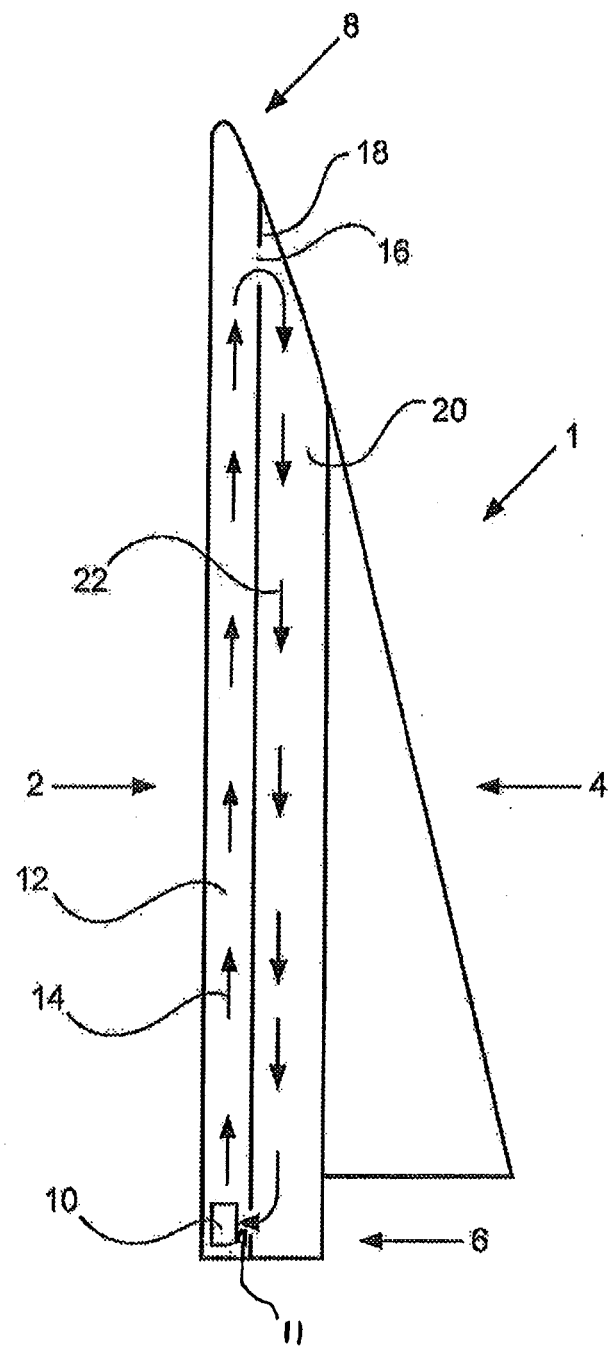

The rotor blade 1 in FIG. 3 has a leading edge 2 and a trailing edge 4. In addition the Figure shows a rotor blade root 6 with which the rotor blade 1 is fixed to a rotor blade hub. Finally a rotor blade tip 8 is shown, which is at the side remote from the rotor blade root 6.

For heating the rotor blade 8 there is a heating device 10 arranged in the region of the rotor blade root 6. Other configurations are possible, in which the heating device 10 is arranged not in the rotor blade but in the rotor blade hub in the immediate proximity of the rotor blade root. Equally the heating device could be fixed to the rotor blade hub, but in such a way that it projects into the root region of the rotor blade root 6. Preferably the heating device 10 is so arranged that an electrical connection between the rotor blade 1 and the rotor hub is avoided.

The heating device 10 is only shown here in the form of a symbol, having a blower and at least one heating element, in particular a resistance heating element like for example heating wires. The heating device 10 then blows heated, at least warmed air, along a first chamber 12 arranged directly adjacent to the leading edge 2. Here the hot air produced is symbolically indicated by arrows as an air flow 14. The hot air flow 14 then flows to the proximity of the rotor blade tip 8 and there passes through an opening 16 in a wall 18. In that way the air passes into a central chamber 20 and flows therein as a return flow 22 symbolically indicated by corresponding arrows, back to the rotor blade root 6. The air which flows back with the return flow 22 is drawn in again by the heating device 10 in the region of the rotor blade root 6, heated and blown into the first chamber 12 again.

Heating is thus effected substantially by a circulating air flow. It is to be noted that the rotor blade 1 is only diagrammatically illustrated to explain the functionality of the heating process. In particular the first chamber 12 and the central chamber 20 are shown in highly simplified form here.

Ice accretion detection by monitoring the installation power which forms the basis for the present method of operating a wind power installation is based on the aerodynamic properties of a rotor blade being altered by icing. To be able to measure and monitor those installation-specific aerodynamic properties it is necessary or at least desirable to record them when the installation is running unlimitedly, that is to say in particular is not limited in terms of its power in order then to compare those properties or corresponding values with the data which are measured at temperatures around or below the freezing point.

When the installation is first brought into operation, the basis adopted is a standard power characteristic which is typical for the rotor blade of the respective installation, and that is stored in the control unit 11 of the wind power installation. That characteristic is a measured power characteristic in relation to the wind speed for the respective type of installation or blade.

At outside temperatures of higher than +2° C. that so-called default characteristic is progressively corrected in dependence on the measured wind speed. For that purpose a respective average value of the wind speed and of the power are typically formed over 60 s. To compensate for fluctuations in density which are caused by different air temperatures the measured power is respectively provided with an outside temperature-dependent correction. In that way scarcely any part is played by whether the characteristic is recorded at +3° C. or +30° C. The value of the power characteristic, that belongs to the measured wind speed, is then corrected upwardly or downwardly in dependence on the measured power by a small part of the deviation, from the stored value. In that way, depending on how long the installation was operated at various wind speeds, an installation-specific power characteristic is formed in relation to the measured wind speed.

Correction of the characteristic is effected in one case only when the installation is running unlimitedly. That means that neither are the rotor blades moved back beyond the predetermined minimum blade angle, that is to say reverse-pitched, nor is the installation power limited by a maximum power which is below the set nominal power. In addition, as already mentioned above, correction of the characteristic is effected only at outside temperatures of higher than +2° C., as below that temperature there is the risk of ice accretion, which would then lead to a falsification of the characteristic and would make ice accretion detection ineffective.

As the installations are operated in the power-optimized and sound-optimized mode of operation with different parameters it is necessary to record independent characteristics for the two operating states. The contents of the stored power characteristics for the power-optimized and sound-optimized modes can be manually displayed and/or selected.

The power characteristics are recorded in operation of the wind power installation, in which respect recording is stopped at temperatures of less than or equal to +2° C., and a start is made with ice accretion detection. A counter is used for that purpose, which counts up at outside temperatures below 2° C. and correspondingly permanently stores the possibility of installation icing. At outside temperatures <+2° C. the timer for ice accretion is counted up within one minute to 360° C. When it reached that value the control unit recognizes that icing is possible and a corresponding ice accretion detection method is activated. It is only if the outside temperature is higher than 2° C. that the counter begins to count slowly again towards zero. In that respect that counting-down speed depends on the outside temperature. The higher the outside temperature is, the correspondingly faster the timer is counted down to zero again and ice accretion detection is concluded and the recording of the characteristics is continued.

If icing is basically possible because of low temperatures the control unit begins to compare the currently measured average power to the stored characteristic. For that purpose a maximum and a minimum power in relation to the respectively measured average wind speed is determined on the basis of the set parameters for monitoring of the power characteristic.

By way of example a tolerance band is determined around the recorded characteristic, the width of which can be different. For example the basis can be a width for the tolerance range up to a wind speed of 10.5 m/s. In that respect a tolerance value can be used, which gives the spacing between the recorded characteristic and a lower or upper limit. A power window, in which the power of the installation can range, is calculated on the basis of that value by the stored power characteristic. The lower value of the power window is the power value of the stored characteristic, at the measured wind speed, less said tolerance value. The upper value is the value of the power characteristic, that belongs to the measured wind speed plus said tolerance value.

The tolerance value can be specified for example as a relative value of the power characteristic and can be for example 75% of the power value in question of the power characteristic. In other words the tolerance is 25% below or above the characteristic.

As soon as icing of the rotor blades is assumed to be occurring and the power P which is typically averaged over 60 seconds—which can also be referred to as the current power $P_{Akt}$—falls below a lower limit value $P_{min}$, a corresponding counter is increased by the value 1. The installation stops with a status 'ice accretion detection: rotor (power measurement)' as soon as the counter reaches the value 30.

The installation automatically resumes operation when the outside temperature has risen for a sufficiently long time to a value of more than 2° C. and a timer for detection of ice accretion has correspondingly counted down again to zero. In a similar manner it restores operation automatically after blade de-icing is terminated. Even if icing is still possible the installation then undertakes an attempt at starting for example at a spacing of 6 hours in order to check whether the rotor blades have become ice-free again. For that purpose the above-mentioned counter is set back from 30 to 27. As soon as the installation is started the power is monitored again. If the blades are still iced up, that should result in the counter counting up again and the installation being already stopped after three counter operations, in the present example therefore after three minutes. If the blades are no longer iced up or are only still slightly iced up, the counter counts down and the installation remains operating. That function provides that the stoppage times due to ice accretion can be shortened.

In an embodiment of a wind power installation there is provided a circulating air blade heating system. The circulating air blade heating system comprises a heating blower of a power of 20 kW per blade—in another configuration this is 25 kW per blade—which is mounted in the blade and which drives air heated up to 72° C. along the leading edge of the blade to the blade tip. In that way it is possible both to de-ice the rotor blades when the installation is stationary and also to keep the rotor blades ice-free when the installation is operating in most cases. The present method therefore concerns both a method in which an ice accretion can be detected and eliminated and also a method which can be used substantially preventatively in order to prevent ice accretion or at least preclude same.

Besides a circulating air blade heating system, in accordance with another embodiment there is proposed a cloth heating arrangement which falls within the generic term of an electrical resistance heating element or an electrical resistance heating arrangement. In that case a wire mesh laminated into the blade is heated with a high current by way of an isolating transformer. Such heating arrangements operate in particular with power levels of between 8 kW and 15 kW per blade. The described mode of operation of the wind power installation can basically use both kinds of blade heating arrangement.

In principle manual de-icing can also be effected with such a blade heating arrangement. If however operation of the blade heating arrangement is in an automatic mode the blade heating arrangement switches on as soon as a counter of an ice accretion detection system has reached a corresponding value, under the above-described criteria. Typically such a counter first reaches a value which corresponds to at least 10 minutes. For example the blade heating arrangement then remains in operation for at least 20 minutes. In that way ice which has already formed on the rotor blades is thawed. The efficiency of the rotor is improved and the ice accretion detection counters go towards zero again if de-icing was at least partly successful. In that way, with a minimum switch-on period for the heating arrangement, this prevents the installation having to be stopped because of ice accretion.

Presetting of the maximum reference power of the blade heating arrangement is possible. In an embodiment that value can be set at between 0 kW and 85 kW. The maximum value of 85 kW is composed of about 3×25 kW for the three heating registers and 3×3.3 kW for the three fans.

Then, having regard to the currently prevailing installation power, the blade heating system takes no more than said set reference power on the five-minute average. If for example a value of 40 kW is set for the reference power then the blade heating arrangement, with the installation stationary or at 0 kW installation power, operates with a maximum of 40 kW, namely 10 kW for the fan and 3×10 kW for the heating system. If operation of the blade heating system is switched on with the installation running the blade heating system is then also operated with increasing installation power at a higher power level and from 30 kW installation power—this for example can be 45 kW in the case of another installation—reaches the maximum power of 70 kW, which can be for example 85 kW in another installation.

The minimum heating period of the blade heating arrangement can be selected to be for example between an hour and ten hours. The heating period depends primarily on the set reference power and the outside temperature. In addition wind speed and the degree of icing play a part. Empirical values have shown that a heating period of between three hours and four hours can be sufficient in most cases.

FIGS. 4 and 5 show an embodiment of a multi-part rotor blade. The rotor blade 400 has a main portion 402 and an end portion 404. The main portion 402 has a connecting region 406 and a blade root region 408. The main portion is connected to the end portion 404 in the connecting region 406. There is also a trailing edge segment 410 fixed to the main portion.

An air guide tube 412 is arranged as an air guide in the main portion. The air guide tube 412 is coupled to a heating blower 414 for producing and delivering heated air. The heating blower can be in the form of a blower with a heating radiator. The heating blower 414 is disposed in the blade root region 408 of the main portion 402 and there produces the heated air and blows it into the air guide tube 412. In another embodiment, the heat for the heating blower 414 comes from the generator in the pod, which naturally produces heat when it makes electricity. The air guide tube 412 guides the heated air through the main portion 402 to the connecting region 406 where it passes into the end portion 404 to heat it. The heated air is thus guided through the air guide tube 412 without in that case issuing into the main portion 402. The heated air guided in the air guide tube 412 is thus not used for heating the main portion 402. Instead of the air guide tube 412 it is also possible for example to use a hose or other suitable structure with which the heated air is guided through the main portion. The air guide tube can have an insulation to minimize unwanted heat dissipation of the heated air.

Provided in the end portion 406 are air guide plates 414 which guide the heated air through the interior of the end portion in such a way that the end portion is heated thereby. Preferably support plates in the rotor blade are used as the plates. The plates guide the heated air on a feed path identified by the arrow 416 to a rotor blade tip 418. Shortly before the rotor blade tip 418 the air is reversed in direction and flows back on a return path identified by the arrow 420 to the connecting region 406. De-icing in particular is to be effected by the heating action. Thermal insulation can be provided in the end portion 406 in the region in which the air flows back, as indicated by the arrow 420, to avoid heat losses there.

From the connecting region 406 the air flows through the main portion 402 back to the root region 408 in which the heating blower 416 is disposed. In this case the air flows through the internal space in the main portion on a return path identified by the arrow 422, in contrast to the feed path, without using an air guide tube.

Alternatively it is also possible to provide for that return path an air guide tube which can have an additional insulation to avoid heat dissipation and thus heat loss.

The heating blower 414 is arranged in the blade root region 408 which has a fixing flange 424 for fixing to a rotor blade hub. In that way the heating blower 414 is disposed in the region of the rotor blade hub and is accordingly readily accessible for maintenance operations. Thus heated air for heating the end portion 404 can be easily fed from a position in the proximity of the rotor hub. Preferably, as in the case of the illustrated rotor blade 400, the main portion 402 is made from metal such as for example steel, thereby providing lightening protection for the heating blower because the main portion acts as a Faraday cage in which the heating blower is arranged. As in the illustrated embodiment the end portion can be made from glass fiber composite material (GRP).

Heating mats 426 are provided for heating the main portion.

The invention claimed is:

1. A method of operating a wind power installation having an aerodynamic rotor with at least one rotor blade, the method comprising:
    operating the wind power installation at an operating point dependent on the wind speed;
    detecting an operating parameter of the operating point, wherein the detected operating parameter is electric power being generated by the wind power installation;
    comparing the detected operating parameter to a first tolerance range and a second tolerance range of a reference parameter, the first tolerance range being within the second tolerance range;
    heating the at least one rotor blade in response to the detected operating parameter being outside of the first tolerance range and within the second tolerance range, while continuing the operation of the wind power installation; and
    stopping or shutting down the wind power installation in response to the detected operating parameter being outside of the first tolerance range and the second tolerance range.

2. The method according to claim 1, wherein the wind power installation is at least one of stopped and powered down, the method further comprising:
    restarting the wind power installation;
    detecting the operating parameter of the operating point for a period of time;
    comparing the detected operating parameter for the period of time to the second tolerance range; and
    at least one of stopping and powering down the wind power installation when the detected operating parameter for the period of time is outside of the second tolerance range over the period of time.

3. The method according to claim 1, further comprising detecting wind speed proximate the wind power installation, wherein the reference parameter depends on the detected wind speed.

4. The method according to claim 1 wherein heating the at least one rotor blade comprises blowing heated air through the rotor blade.

5. The method according to claim 4 wherein blowing heated air through the rotor blade comprises blowing heated air through a conduit in the rotor blade.

6. The method according to claim 1, further comprising:
    detecting a temperature at or proximate the wind power installation; and
    at least one of stopping and powering down the wind power installation when the detected temperature exceeds a threshold minimum temperature and when the detected operating parameter exceeds a threshold deviation relative to the reference parameter.

7. The method according to claim 1 wherein heating the at least one rotor blade comprises heating the at least one rotor blade when the detected operating parameter exceeds a threshold deviation for a threshold amount of time.

8. A wind power installation comprising:
    a rotor having at least one rotor blade that includes a main portion and an end portion, wherein the main portion includes an air guide conduit configured to deliver heated air through the main portion to an interior of the end portion;
    a heating device;
    a blower; and
    a control unit configured to detect electric power generated by the wind power installation and to compare the detected electric power to first and second threshold reference parameters, the control unit configured to, in a first operation, activate the heating device and the blower in response to the detected electric power exceeding a deviation of the first threshold reference parameter and to cause heated air to blow through the air guide conduit of the main portion of the at least one rotor blade while the wind power installation is in operation, the control unit configured to, in a second operation, power down the wind power installation in response to the detected electric power exceeding a deviation of the second threshold reference parameter.

9. The wind power installation according to claim 8 further comprising an anemometer configured to measure wind speed proximate the rotor, wherein the first and second threshold reference parameters are dependent on wind speed.

10. The wind power installation of claim 8 wherein the control unit is configured to activate the heating device and the blower in response to the detected electric power exceeding the deviation of the threshold reference parameter for a threshold period of time.

11. A method of operating a wind power installation comprising an aerodynamic rotor having at least one rotor blade, the method comprising:
    monitoring whether there is icing on the wind power installation by measuring the electric power generated by the wind power installation; and
    when the electric power passes a first threshold, heating the at least one rotor blade, while operation of the wind power installation is continued, and when the electric power passes a second threshold that is less than the first threshold, powering down the wind power installation.

12. A method of operating a wind park comprising a plurality of mutually communicating wind power installations, each of the wind power installations comprising an aerodynamic rotor having at least one rotor blade, the method comprising:
    monitoring whether there is icing on at least one of the wind power installations by measuring the electric power generated by the at least one of the wind power installations; and
    when the electric power passes a first threshold, heating the at least one rotor blade of each of the wind power installations in the wind park, while operation of each of the wind power installations of the wind park is continued, and when the electric power passes a second threshold that is less than the first threshold, powering down the wind power installation.

* * * * *